United States Patent [19]
Fekete et al.

[11] Patent Number: 5,792,496
[45] Date of Patent: Aug. 11, 1998

[54] EDIBLE SHELL/THERMOPLASTIC CONTAINER SYSTEM

[76] Inventors: Ferenc Fekete; Kai Chung-Ho, both of 30/F, Room 3001-3, Natwest Tower, Times Square 1 Matheson Street, Causeway Bay, Hong Kong

[21] Appl. No.: 780,832

[22] Filed: Jan. 10, 1997

[51] Int. Cl.$^6$ ............................. A23G 1/00; A23G 3/00; A21D 13/00

[52] U.S. Cl. ................. 426/104; 426/132; 426/138; 220/4.21; 220/4.25

[58] Field of Search .................... 426/104, 132, 426/138

[56] References Cited

U.S. PATENT DOCUMENTS

| 211,420 | 1/1879 | Moses | 426/104 |
|---|---|---|---|
| 294,575 | 3/1884 | Britton | 426/104 |
| 911,051 | 2/1909 | Bourgeois . | |
| 1,301,118 | 4/1919 | Gartner | 426/104 |
| 1,382,601 | 6/1921 | Cressey | 426/104 |
| 1,383,290 | 7/1921 | Cressey | 426/104 |
| 1,800,990 | 4/1931 | Forrest | 426/104 |
| 2,452,174 | 10/1948 | Arnold . | |
| 2,834,501 | 5/1958 | Nutter . | |
| 4,103,774 | 8/1978 | Shingyouchi . | |
| 4,106,657 | 8/1978 | Dogliotti . | |
| 4,593,817 | 6/1986 | Ferrero . | |
| 4,765,501 | 8/1988 | Kao . | |
| 5,302,403 | 4/1994 | Cook et al. | 426/104 |
| 5,545,069 | 8/1996 | Glynn et al. | 426/104 |

FOREIGN PATENT DOCUMENTS

| 2324344 | 12/1974 | Germany | 426/132 |
|---|---|---|---|
| 2935691 | 3/1981 | Germany | 426/104 |
| 416970 | 9/1934 | United Kingdom | 426/132 |
| 1596765 | 8/1981 | United Kingdom | 426/104 |
| WO93/00267 | 1/1993 | WIPO | 426/132 |
| WO93/03624 | 3/1993 | WIPO | 426/104 |

*Primary Examiner*—Steven Weinstein
*Attorney, Agent, or Firm*—Dorr, Carson, Sloan & Birney, P.C.

[57] ABSTRACT

An edible shell/thermoplastic container system consists of a first substantially hemispherical edible shell and a second substantially hemispherical edible shell. The thermoplastic container preferably consists of a first substantially non-hemispherical shell and a second substantially non-hemispherical shell that differs from the first non-hemispherical shell. The first non-hemispherical thermoplastic shell and second non-hemispherical thermoplastic shell are held together by a fastening system that can be easily unfastened to gain access to a novelty item that may be stored in said thermoplastic container.

13 Claims, 2 Drawing Sheets

EDIBLE SHELL/THERMOPLASTIC CONTAINER SYSTEM

BACKGROUND OF THE INVENTION

1. Field of the Invention

The present invention generally relates to small, shell-like, hemispherical containers used to hold small toys, novelty items, coins or pieces of candy. Such containers are often included in breakfast cereal boxes and the like as prize, novelty or treat items. Containers of this kind are usually made of hard thermoplastic materials in the form of a first hemispherical shell and a second hemispherical shell fastened together at their respective equator regions to produce a hollow, sphere-like, or ellipsoid-like, container. This fastening is done in a manner such that the two hemispherical shells can be readily broken apart in order to gain access to the prize, novelty or treat item stored therein.

2. Description of the Prior Art

Shell-like, thermoplastic containers for holding a prize, novelty or treat item are well known (for example, Nestlé® Chocoladen GmbH, Frankfurt, Germany markets a product under the trademark Wunder-Kugel® that is comprised of a chocolate shell that surrounds such a shell-like, thermoplastic container that, in turn, contains a toy or novelty item. Shell-like containers for holding various other items also are well known. For example, U.S. Pat. No. 2,452,174 ("the '174 patent") teaches a shipping container for individual citrus fruit items such as individual oranges. It is comprised of two substantially hemispherical halves that are mechanically fastened together. One hemisphere has a lower edge that is offset from the true center line of the spherical container that is produced when the two hemispheres are fastened together.

U.S. Pat. No. 4,765,501 discloses a toy container having an upper shell and a lower shell. The upper shell has three annular ribs that engage three cooperating grooves in the lower shell. The upper edge of the lower shell is on, or very near, an imaginary center line of the sphere produced by combining the upper and lower shells.

U.S. Pat. No. 2,834,501 depicts a virtually spherical shell having a first shell segment that constitutes more than half of the sphere. A second shell segment is fastened to the first segment to produce a substantially spherical shell.

U.S. Pat. No. 911,051 teaches a shipping container for individual eggs. The container is comprised of two hemispherical shells wherein the mouth of one of the hemispheres has a diameter larger than that of the other. The two shells are telescoped together until they securely hold the egg.

U.S. Pat. No. 4,106,657 teaches a gift container comprised of two cup-shaped halves.

U.S. Pat. No. 4,103,774 teaches a capsule comprised of two essentially hemispherical half shells whose abutment line approximates an imaginary center line of the resulting sphere.

U.S. Pat. No. 4,593,817 teaches a container having an animal-like appearance. The container has two cup-shaped compartments that are joined by a cylindrical side wall having an outside diameter that is slightly less than the diameter of the free edges of the two cup-shaped compartments.

Most of the above-noted shell-like containers are not particularly well suited for use in chocolate shells or as containers for small novelty items. Some are too easily broken apart (especially during shipping), some are too complex (and hence too costly to make) and some have fastening devices that are too difficult for children to unfasten. The tendency of many such shell-like containers to break open during shipment has several negative implications. For example, the overall esthetic value of an edible shell/thermoplastic container/novelty item system is considerably diminished if the thermoplastic container is broken open during assembly or shipment and presented, especially to a child, in such a state. Consequently, production of more durable, shock resistant thermoplastic containers for use in conjunction with surrounding edible shells and with novelty items contained therein is one of the main objects of this invention.

SUMMARY OF THE INVENTION

Given the above-noted facts, circumstances and problems, One of the main objects of the present invention is to provide a two component, edible shell/thermoplastic container system wherein the thermoplastic container is less likely to be accidentally broken open during shipment and handling of the edible shell/thermoplastic container system. Applicant has found that this problem can be overcome if the spherical (or ellipsoidal) shell-like, thermoplastic container is made by joining two hemispherical (or ellipsoidal) elements at an abutment line that does not coincide with the equator formed where the two edible shell halves are fused together. Thus, by remaining intact during shipment and handling, such thermoplastic shells better serve as containers for a small toy, coin novelty item, piece of candy, etc. until such time as the consumer (often a child) wishes to open the thermoplastic container in order to gain access to the item stored therein. It also might be noted at this point that, for purposes of this patent disclosure, any such item stored in the thermoplastic container will generally be referred to as a novelty item ("novelty item") regardless of its more specific identity.

Nomenclature aside, in order to provide mechanically stable, edible shell/thermoplastic container or edible shell/thermoplastic container/novelty item systems, applicant employs an edible shell/thermoplastic container system comprised of an edible shell that surrounds a thermoplastic container that is comprised of two detachably associated half shells that, in turn, may contain a novelty item. The edible shell component of such systems is preferably made of an edible material such chocolate, hard candy, cookie dough, etc. and is comprised of two half shells that are joined to each other at their respective equators. The two edible shells may be, but need not be, identical in their overall shape or configuration. They should however have equator regions having substantially the same size and shape (e.g., two equally sized, ring-like, equator regions). For example, one edible half shell can be a true hemisphere, while the other edible half shell can be ellipsoidal in configuration—but still having a circular equatorial cross section that coincides with the circular equatorial cross section of the edible half shell having a true hemisphere configuration.

The thermoplastic container can likewise be spherical or ellipsoidal in configuration. In either case the thermoplastic container should readily fit inside of a similarly configured edible shell. In one particularly preferred embodiment of this invention (see FIGS. 1 and 2), the thermoplastic container will be comprised of a first non-hemispherical half shell and a second, non-hemispherical half shell having a different configuration from that of the first non-hemispherical half shell. When these two non-hemispherical half shells are combined, however, they will produce an overall configuration that is substantially spherical in nature.

The mechanical fastening of the two thermoplastic container half shells can be accomplished in various ways. For example, they may be detachably fastened to each other by an annular rib and groove systems such as that shown in FIGS. 1 and 2. Other appropriate fastening means such as appropriately threaded equator regions, cooperating teeth and pawl mechanisms, etc. can likewise be employed to hold the two halves of the thermoplastic container together. Regardless of the fastening means employed however, the two thermoplastic container half shells should be capable of remaining securely fastened together during shipment and handling—and, in some cases, thereby contain a novelty item stored therein—but still be capable of being easily (e.g., by hand, rather than through use of a hand tool) unfastened and separated in order to gain access to the novelty item. It also is highly preferred that the fastening devices used to hold the two half shells in a substantially spherical (or substantially ellipsoidal) configuration operate from the inside surface of the equator regions of the respective half shells so that the fastening device does not present a irregular or protruding region on the exterior surface of the thermoplastic container. Such a surface might, during shipping and handling, serve to break the edible shell that surrounds the thermoplastic container.

The two halves of the thermoplastic container component of applicants' edible shell/thermoplastic container system also may be provided with fastening devices that may be adapted and arranged so that they can be telescoped together to some degree. For example, the two halves of the thermoplastic container can be provided with an extended rib and groove system (e.g., a system having more than two rows of ribs and grooves depicted in FIGS. 1 and 2) such that one half of the thermoplastic container can overlap the other half until the two halves come in contact with a suitably sized novelty item stored in the shell so that said novelty item will not rattle around in the thermoplastic container. Threaded cooperation of the two half shells that make up the thermoplastic container also could achieve this same holding effect on certain appropriately sized novelty items.

The edible shell/thermoplastic container system of this patent disclosure most preferably will employ two substantially spherical (or substantially ellipsoidal, or half spherical/ half ellipsoidal) edible shells to form a substantially spherical (or substantially ellipsoidal or hybrid spherical/ ellipsoidal) edible shell having a visually perceptible equator. This edible shell loosely encases a thermoplastic container comprised of two half shells that associate in such a way as to define an abutment crack line that will be offset from the equator formed by the two substantially identical hemispherical half shells that make up the spherical, edible shell when the equator of the edible shell and the abutment crack line of the thermoplastic container are parallel to each other. That is to say that applicants have found that thermoplastic containers having an abutment line that is offset from the true equator line of the edible shell sphere are much less susceptible to being broken apart during shipping and handling relative to otherwise comparable thermoplastic containers wherein the abutment line of the two thermoplastic half shells and the equator of a spherical thermoplastic container coincide.

The material from which the thermoplastic containers of this patent disclosure can be made (e.g., by injection molding, blow molding, etc.) include a wide variety of so-called thermoplastic materials such as polyethylene, ethyl vinyl acetate, ethyl cellulose and poly vinyl chloride. A wide variety of mixtures of such thermoplastic materials can likewise be employed. For example, applicants have found that a thermoplastic reaction mixture comprised of about 80 weight percent high density polyethylene and about 20 weight percent vinyl acetate gives the resulting containers particularly good resiliency, impact and crack resistant qualities. This reaction mixture also so provides a thermoplastic material that aids the compression-fitting elements of rib and groove type fasteners in performing their mechanical holding/release functions.

Since the thermoplastic container will be enclosed within an outer shell of an edible material, the thermoplastic material must be of a type suitable for use with food products. These thermoplastic containers also may be colored e.g., by including dyes or other coloring agents in the thermoplastic starting material(s). The thermoplastic materials from which these containers are made also may include various chemical agents known to the food container manufacturing arts that serve to retard growth of various harmful microorganisms such as molds, fungi, bacteria, etc. Such containers also may be coated on their outside and/or inside surfaces with various preservative agents that likewise may serve to prevent growth of microorganisms that may be harmful to the edible shell and/or to an edible novelty item stored in the container.

The thermoplastic containers contemplated by this patent disclosure will preferably have inside diameters ranging from about 40 to about 60 millimeters. The thickness of the walls of these containers can vary considerably, but generally speaking they should be such that the container is strong enough and shock-resistant enough to remain intact during assembly, handling and shipment. Preferably, these walls will have thicknesses (see, item "T" in FIG. 2) ranging from about 0.75 millimeters to about 1.25 millimeters— depending upon such factors as the chemical identity of the thermoplastic material used to make the container and the nature of the novelty item that may be stored therein.

DETAILED DESCRIPTION OF THE PREFERRED EMBODIMENTS

Figure 1:
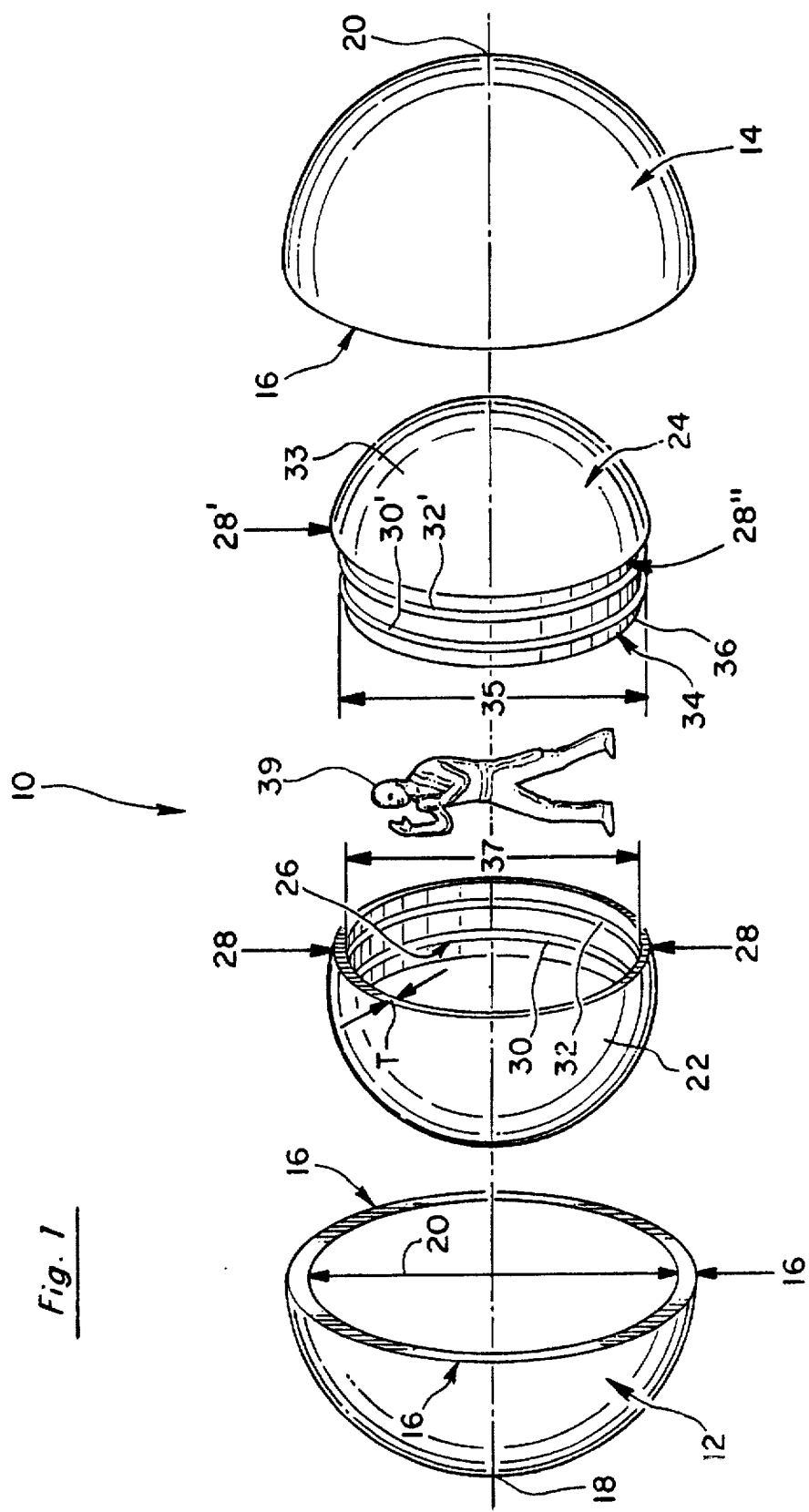
FIG. 1 is an exploded, perspective view of an embodiment of the edible shell/thermoplastic container system of this invention in which a novelty item is enclosed within the thermoplastic container.

FIG. 1 is an exploded, perspective view of a preferred embodiment of the edible shell/thermoplastic container system of this invention, in which a novelty item, such as a figurine, is enclosed within the thermoplastic container component of the system. As shown in FIG. 1, the edible shell/thermoplastic container system 10 of the present invention includes an outer shell comprised of a first half shell 12 and a second half shell 14 which are secured together to form the circular outer shell component of the system. In accordance with a preferred embodiment of the invention, both half shell sections 12 and 14 have the same configuration. The half shell sections 12 and 14 are both formed of an edible material, such as, for example, chocolate, cookie dough, candy or other confections, and the like. Half shell sections 12 and 14 preferably are formed of the same edible material, but may, if desired, be formed of different edible materials.

At this point, it might also be noted that for purposes of illustrating this patent disclosure, the terms "half shell," "hemisphere" and "hemiellipsoid" each may be taken, where appropriate, to mean (1) one half of a truly spherically configured shell or (2) one half of a truly ellipsoidally configured shell (e.g., half of a shell having the configuration of an American style football) or (3) a half shell that is not truly hemispherical (or not truly ellipsoidal) in configuration—but which still gives a generally hemispherical (or ellipsoidal) appearance.

In one of the most preferred embodiments of this invention, however, the first edible half shell 12 will have a truly hemispherical configuration and the second edible half shell 14 will likewise have a truly hemispherical configuration.

Be the stereo configurations of these edible half shells as they may, when they are placed in an abutting relationship with each other at their respective equators, they will define an equatorial line 16 that may or may not lie midway between the end 18 of the first edible half shell 12 and the end 20 of the second edible half shell 14. In FIG. 1, this equatorial line 16 is intended to lie midway between the end 18 of the first half shell 12 and the end 20 of a substantially identical second half shell 14. Hence, line 16 is a true equator line of the spherical shell formed by combining the substantially identical half shells 12 and 14.

The edible shell/thermoplastic container/novelty item system 10 of FIG. 1 also depicts two disengaged, non-identical, thermoplastic shell halves 22 and 24. The first thermoplastic container shell half 22 is depicted as being substantially hemispherical in configuration. The interior 26 of its equator region 28 is shown provided with two annular grooves 30 and 32. The second thermoplastic container shell half 24 also has a substantially hemispherical portion 33. It is, however, also provided with a protruding member 34 having a circular end region 36. This protruding member 34 has an outside diameter 35 (including the height of ribs 30' and 32') that is only slightly less than the inside diameter 37 of the first thermoplastic container shell half 22. The two ribs 30' and 32' shown on protruding member 34 are sized, shaped, adapted and arranged so as to fit into the counterpart grooves 30 and 32 in the interior 26 of the equator region 28 of the first thermoplastic shell 22. Given the somewhat pliable, compressible and resilient nature of the thermoplastic materials from which the first container shell half 22 and the second container shell half 24 are made, this rib and groove system enables the two thermoplastic half shells 22 and 24 to be securely fastened together, but still be easily unfastened and separated into two half shells in order to gain access to the novelty item (e.g., prize, toy, piece of candy, etc.) 39 that may be housed in the assembled thermoplastic container.

Figure 2:
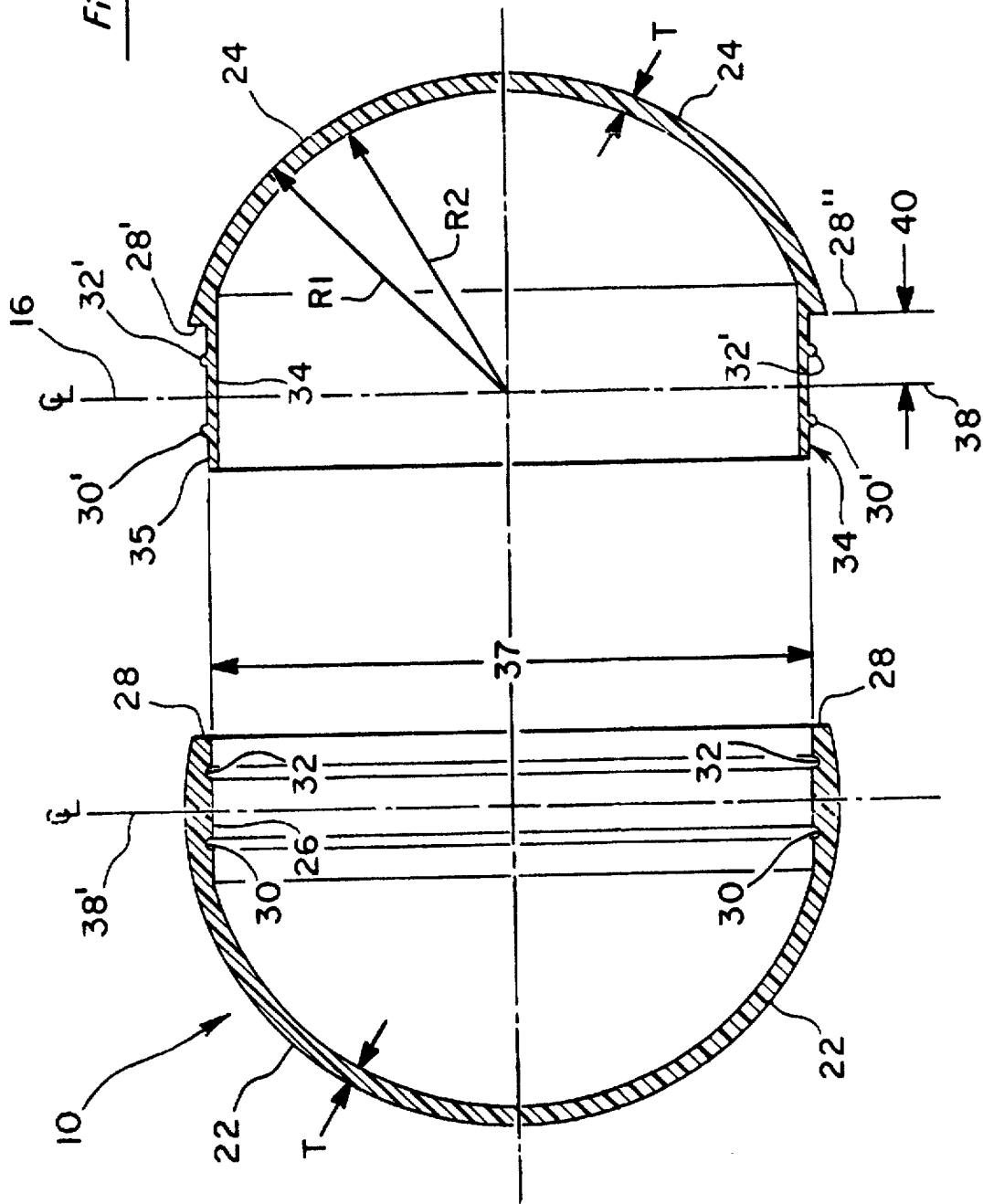
FIG. 2 is a cross sectional view of the thermoplastic container component of the present invention in which the container comprises two non-identical, hemispherical portions.

FIG. 2 shows a cross sectional view of the first thermoplastic container shell half 22 and second shell half 24 shown in FIG. 1. The inside surface 26 of the equator region 28 of the first container shell half 22 is shown provided with two grooves 30 and 32. The outside surface of protruding member 34 of the second shell half 24 is shown in FIG. 2 provided with two ribs 30' and 32' that encompass protruding member 34. Again, ribs 30' and 32' are sized, shaped, positioned, adapted and arranged to respectively fit into the two grooves 30 and 32 in the first shell half 22. This rib and groove system is a highly preferred method of fastening the two shell halves 22 and 24 together so that they remain attached to each other during shipment, but thereafter can be readily unfastened in order to gain access to a novelty item that may be stored therein. Again, these fastening and unfastening functions may be aided by the chemical nature of the material from which the thermoplastic container is originally constructed. Applicants have for example found that thermoplastic materials made from reaction mixtures comprised of about 80 weight percent high density polyethylene and about 20 weight percent vinyl acetate are particularly well suited to producing a thermoplastic material that aids the compression-fitting aspect of the fastening function of applicants, preferred rib and groove fastener device.

FIG. 2 also illustrates where an abutment crack line 28' will be produced by an abutting relationship of the equatorial region 28 of the first thermoplastic shell half 22 with an abutment ledge 28", of the second thermoplastic half shell 24 when the two half shells 22 and 24 are fastened to each other by virtue of the fact that ribs 30' and 32' of half shell 24 are respectively pressed into grooves 30 and 32 of half shell 22. The cross sectional view of the second half shell 24 also illustrates that the abutment crack line 28' defined by the abutting relationship of support half shells 22 and 24 is offset from the true center line 38 of the generally spherical container that is created by combining the two half shells 22 and 24. That is to say that abutment crack line 28' and center line 38 of the resulting sphere do not coincide. In FIG. 2, they are shown separated from each other by an offset distance 40. The offset distance 40 between the center line 38 and the abutment crack line 28' shown with respect to half shell 24 also may vary depending on the number of ribs 30', 32', etc. used to create the fastener device.

Preferably, this distance 40 will be from about 2 millimeters to about 10 millimeters in length. Applicants have that, given the 40 to 60 millimeter diameters of these containers, those having an offset distance 40 of about 6 millimeters are especially able to resist breakage during shipment and handling. Be this distance 40 as it may, the non-coincidence of center line 38 and abutment crack line 28' is one sense in which expressions like "half shell," "not 'truly', hemispherical," "substantially hemispherical" (or "substantially ellipsoidal"), "non-hemispherical" and "non-identical" may be used in this patent disclosure. Another sense of these expressions in this patent disclosure can follow from the fact that one radius of a resulting sphere, such as radius $R_1$ shown for half shell 24 in FIG. 2, does not equal another radius $R_2$. This non-equality implies that the resulting sphere may be somewhat ellipsoidal in nature. Yet another sense of the differences expressed by use of these expressions is the fact that a second half shell such as that shown in FIGS. 1 and 2 may have an additional feature or element, such as protruding member 34, that is simply not possessed by the first half shell.

FIG. 2 also illustrates why, in a system comprised of a substantially spherical thermoplastic container formed by connecting half shells 22 and 24 and covered with two truly hemispherical edible shells, the equatorial center line 16 of the two edible shells shown in FIG. 1 will not overlappingly coincide with the abutment crack line 28' of the thermoplastic container when these two lines lie parallel to each other.

Finally, those skilled in this art also will appreciate that the configurations employed in the hereindescribed edible shell/thermoplastic container systems will be those appropriate to the particular edible materials being used. As was previously noted, other variations may be introduced as a result of using different half shall configurations and edible materials in the same edible shell. In any case, while this invention generally has been described in terms of the general discussions, specific examples and preferred embodiments, none of these should be taken individually as a limit upon the overall inventive concepts described herein.

Thus having disclosed our invention, we claim:

1. An edible shell/thermoplastic container system comprising a substantially spherical edible shell having an equator formed where two substantially hemispherical edible shells are joined to form the substantially spherical edible shell, a substantially spherical thermoplastic container that resides in the spherical edible shell and wherein said thermoplastic container is comprised of two half shells that define an abutment crack line that is offset from a parallel centerline of the themoplastic container by about 2 to about 10 millimeters and wherein the abutment crack line of the thermoplastic container also is offset from the edible shell equator when the abutment crack line of the thermoplastic container has a parallel orientation with respect to the edible shell equator and wherein the two half shells that comprise the thermoplastic container are held together by a fastener device that is capable of being readily unfastened.

2. The edible shell/thermoplastic container system of claim 1 wherein the substantially spherical edible shell is made of chocolate.

3. The edible shell/thermoplastic container system of claim 1 wherein the thermoplastic container is made of a thermoplastic material comprised of about 80 weight percent high density polyethylene and about 20 weight percent vinyl acetate.

4. The edible shell/thermoplastic container system of claim 1 wherein the thermoplastic container has a diameter of from about 40 to about 60 millimeters and a shell wall thickness of from about 0.75 to about 1.25 millimeters.

5. The edible shell/thermoplastic container system of claim 1 that further comprises a novelty item that resides in the thermoplastic container.

6. An edible shell/thermoplastic container system comprising a substantially ellipsoidal edible shell having an equator formed where two substantially hemiellipsoidal edible shells are joined to form the substantially ellipsoidal edible shell, a substantially ellipsoidal thermoplastic container that resides in the substantially ellipsoidal edible shell and wherein said thermoplastic container is comprised of two half shells that define an abutment crack line that is offset from a parallel centerline of the thermoplastic container by about 2 to about 10 millimeters and wherein the abutment crack line of the, thermoplastic container also is offset from the equator of the edible shell when said abutment crack line of the thermoplastic container has a parallel orientation with respect to the equator of the edible shell and wherein the two half shells that comprise the thermoplastic container are held together by a fastener device that is capable of being readily unfastened.

7. The edible shell/thermoplastic container system of claim 6 wherein the substantially ellipsoidal edible shell is made of chocolate.

8. The edible shell/thermoplastic container system of claim 6 wherein the thermoplastic container is made of a thermoplastic material comprised of about 80 weight percent high density polyethylene and about 20 weight percent vinyl acetate.

9. The edible shell/thermoplastic container system of claim 6 wherein the thermoplastic container has a diameter of from about 40 to about 60 millimeters and a shell wall thickness of from about 0.75 to about 1.25 millimeters.

10. The edible shell/thermoplastic container system of claim 6 that further comprises a novelty item that resides in the thermoplastic container.

11. A chocolate shell/thermoplastic container/novelty item system comprising a first substantially hemispherical chocolate shell and a second substantially hemispherical chocolate shell joined together to form a substantially spherical chocolate shell having an equator formed where the first substantially hemispherical chocolate shell is joined to the second substantially hemispherical chocolate shell, a substantially spherical thermoplastic container that resides in the chocolate shell and is comprised of a first non-hemispherical thermoplastic shell and a second non-hemispherical thermoplastic shell that define an abutment crack line that is offset from a parallel centerline of the thermoplastic container by about 2 to about 10 millimeters and wherein the abutment crack line of the thermoplastic container also is offset from the equator of the chocolate shell when the abutment crack line of the thermoplastic container has a parallel orientation with respect to the equator of the chocolate shell and wherein the first and second non-hemispherical thermoplastic shells are held together by a fastener comprised of two annular grooves in an interior surface of the first non-hemispherical thermoplastic shell and two mechanically cooperating annular ribs in a protruding region of the second non-hemispherical thermoplastic shell to hold the first substantially non-hemispherical thermoplastic shell and the second, substantially non-hemispherical thermoplastic shell together, and a novelty item stored in said thermoplastic container.

12. The chocolate shell/thermoplastic container/novelty item system of claim 11 wherein the thermoplastic container is made of a thermoplastic material comprised of about 80 weight percent high density polyethylene and about 20 weight percent vinyl acetate.

13. The chocolate shell/thermoplastic container/novelty item system of claim 11 wherein the thermoplastic container has a diameter of from about 40 to about 60 millimeters and a shell wall thickness of from about 0.75 to about 1.25 millimeters.

* * * * *